Patented Dec. 2, 1952

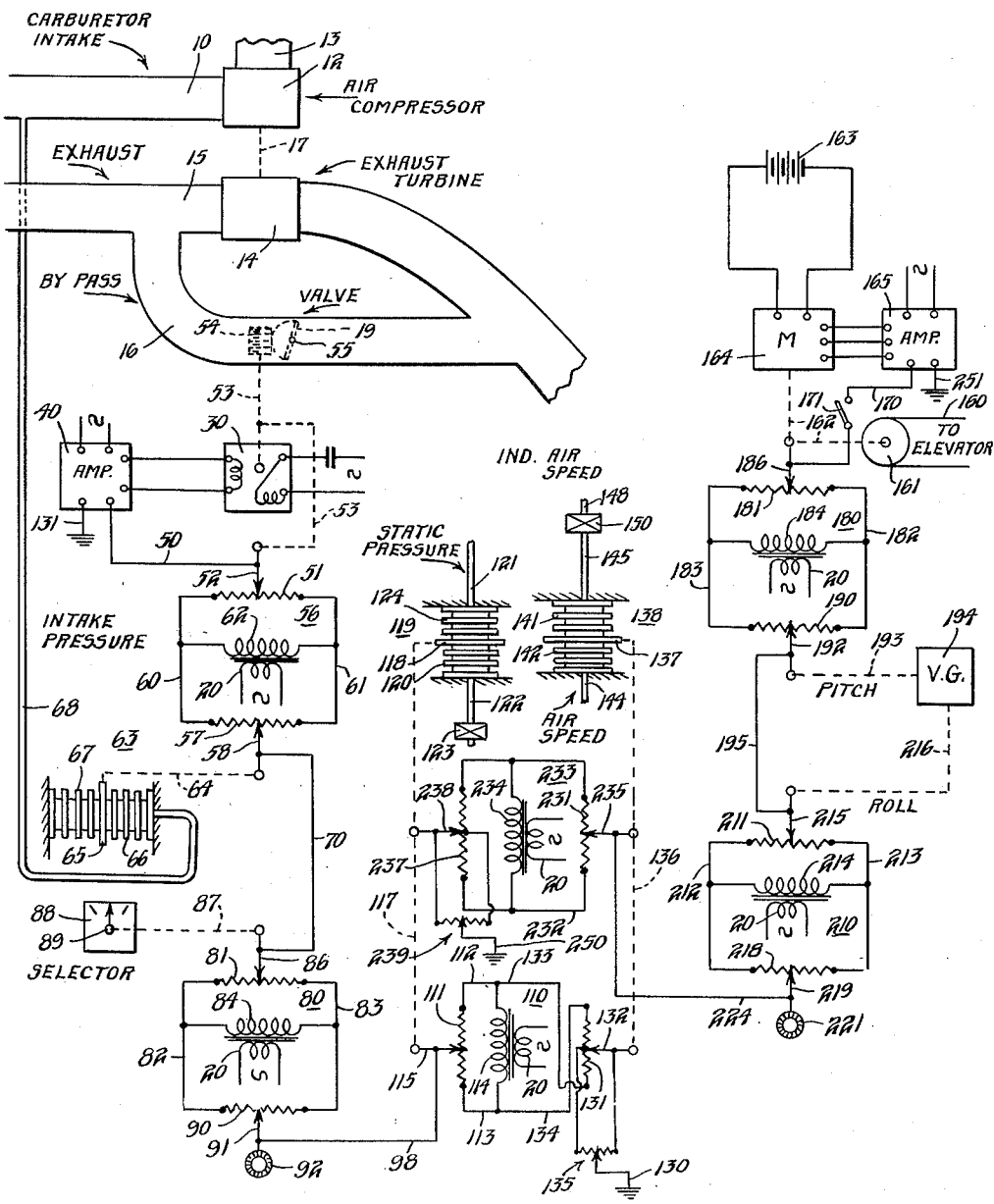

2,620,149

UNITED STATES PATENT OFFICE 2,620,149

AIRCRAFT CONTROL APPARATUS

Fred P. Strother, Riverside, Conn., assignor to Minneapolis-Honeywell Regulator Company, Minneapolis, Minn., a corporation of Delaware Application December 5, 1947, Serial No. 789,831

18 Claims. (Cl. 244—77)

My invention is an improvement in apparatus for controlling an aircraft in flight. An apparatus embodying my invention coacts with a control surface which positions the aircraft about one axis thereof and coacts with the power means for propelling the aircraft.

An object of my invention is to provide in such apparatus means responsive to variations of the aircraft from a selected altitude and from a selected air speed for jointly controlling the operation of the control surface and the power of the propelling means.

A further object of my invention is to provide in such apparatus having altitude and air speed responsive means two balanceable systems so that the control applied to said control surface and said power means is proportional to the extent of variation in altitude and air speed.

A further object of my invention is to provide devices responsive to changes in altitude and air speed of the aircraft which coact with a pressure responsive device tending to maintain nearly constant the power of the propelling means of an aircraft and also which coact with a device responsive to movement of the aircraft about an axis which tends to maintain the attitude of the aircraft through a control surface.

A further object of my invention is to provide in such apparatus having altitude and air speed responsive means for controlling a control surface of said aircraft and power means for propelling said aircraft, means responsive to the tilt of the aircraft about an axis to modify the position of the control surface during changes in altitude or in air speeds so that a compensating effect may be applied to said aircraft through said control surface while corrections for changes in altitude or air speeds are also applied through said power means.

A further object of my invention is to provide a joint control of the control surface of an aircraft which controls the position of the aircraft about an axis, by an altitude responsive device and by an air speed responsive device.

A further object of my invention is to provide a device responsive to the movement of the aircraft about two axes and devices responsive to changes in altitude and air speed of the aircraft for controlling a control surface and power means whereby for incurred changes in altitude or air speed the device responsive to the movement of the aircraft about two axes modifies a compensating operation of the control surface while corrections for the change in altitude and air speed are applied to the power means and wherein said altitude and air speed responsive devices may modify the displacement of the control surface as initiated by the axis responsive device upon movement of the aircraft about a second axis.

Further objects of my invention will be apparent by reference to the accompanying description of an embodiment thereof which is illustrated in the drawing. The particular form of the apparatus to be described merely illustrates one arrangement for effecting my invention. It is not necessarily limited thereto but may be measured by the statements of the claims.

The sole figure of the drawing shows the preferred arrangement of the apparatus embodying the invention.

In said arrangement, the power means or aircraft engine (not shown) has its carburetor connected to a carburetor intake line 10 similar to the arrangement provided by D. G. Taylor in Patent 2,388,350, dated November 6, 1945. The power developed by such aircraft engine depends upon the weight of air and fuel mixture supplied in any given time. The weight of air and fuel mixture supplied to the engine depends upon the pressure within the line 10. The line 10 is supplied with air under pressure by a variable speed air compressor 12. The compressor 12 is driven by an exhaust turbine 14. The speed of the turbine 14 which determines the speed of compressor 12 and the resulting pressure within the line 10 is controlled by a valve 19 designated a waste gate.

Thus as the valve 19 is adjusted to vary the pressure in line 10 the engine power varies. The valve 19 is operated by a reversible electric motor 30. The motor 30 may be of the reversible two-phase type similar to that disclosed in the aforementioned patent and is controlled by an amplifier 40.

The amplifier 40 has an input circuit which is controlled by an intake line pressure responsive element 63 which tends to maintain nearly constant the pressure within the carburetor intake line 10 as the aircraft moves from ground position to high altitudes.

Amplifier 40 is also controlled by a selector 88 by which the pressures which are to be approximately maintained in line 10 may be selected.

Further control of amplifier 40 is obtained by an altitude responsive device 119 which so controls amplifier 40 as to cause a reduction in pressure in line 10 as the desired altitude is exceeded.

An indicated air speed responsive device 138 also controls amplifier 40 in such manner as to decrease the pressure within intake line 10 if speed above that desired is exceeded.

The control surface which in this invention illustrated is the conventional elevator, not shown, of an aircraft is operated from cables 160 from a cable drum 161. The cable drum 161 is driven by a motor 164 which is reversibly controlled by an amplifier 165.

The amplifier 165 includes an input circuit which is controlled by a vertical flight gyro 194 to stabilize the aircraft about the pitch axis.

Amplifier 165 is also controlled by the altitude responsive device 119 which so controls the amplifier as to cause the downward positioning of the elevator if the plane exceeds the desired altitude.

Amplifier 165 has its input also controlled by an air speed responsive device 138 which so controls amplifier 165 as to cause the application of down elevator if less than the desired air speed is obtained. For excesss air speed, the amplifier 165 is so controlled as to apply up elevator.

The vertical flight gyro 194 also controls amplifier 165 so as to apply up elevator when the aircraft is banked.

Having given a general impression of the operation of the embodiment illustrated, the specific details thereof will be described. Since the intake pressure, therefore developed by the aircraft engine is controlled by the motor 30 which positions the waste gate 19, the control elements associated with motor 30 will be described first. As previously noted motor 30 is controlled by amplifier 40.

The direction of rotation of motor 30 depends upon the instantaneous phase relationship between the line voltage or that supplied to motor 30 and amplifier 40 and the voltage across the signal input terminals connected to leads 50 and 131 of amplifier 40. The phase and magnitude of the voltage across the terminals of amplifier 40 connected to leads 50 and 131 is determined by a circuit which includes lead 50, rebalancing-intake pressure network 56, lead 70, turbo boost selector-calibrating impedance network 80, lead 98, altitude-airspeed impedance network 110, lead 130, to ground and to grounded lead 131 and to the amplifier. The series connected impedance networks 56, 80, and 110 which are included in the input circuit to amplifier 40 are in themselves sources of signal voltage. The phase of the voltage across the terminals connected to leads 50 and 131 of amplifier 40 is dependent upon the algebraic sum of the voltages in the separate networks. In response to an initiating signal in any one of the impedance networks 56, 80, or 110 the amplifier 40 causes the motor 30 to operate to position the valve 19.

The rebalancing-intake pressure impedance network 56 comprises a carburetor intake pressure responsive potentiometer having a resistor 57 whose opposite ends are connected respectively by means of leads 60 and 61 to the corresponding ends of a secondary winding 62 of a transformer. The transformer is provided with a primary winding 20. Since in the several networks to be described, the individual secondary windings thereof may have a common primary winding, the reference character, 20, is used to indicate the primary windings in each instance. The primary winding 20 is supplied with alternating current from a supply which may be the inverter (not shown) of the aircraft. A wiper 58 bears upon the surface of resistor 57 and it is operated by an operating connection 64 extending from a dividing wall 65 of a double bellows 63 which constitutes the intake line pressure responsive device.

The double bellows device 63 includes a right section 66 and a left section 67 and they are interposed between two fixed frame elements, as shown. The left bellows 67 has been evacuated and a conventional spring (not shown) is mounted within the bellows 67 and exerts a pressure upon the dividing wall 65. The right bellows 66 has pressure applied thereto from a lead 68 extending from the carburetor intake line 10. Any differential pressure between the pressure exerted by the spring on the dividing wall 65 and that exerted upon the wall 65 by the pressure within the carburetor intake is applied through the operating connection 64 to wiper 58. Due to the fact that atmospheric pressure acts equally in opposite directions upon bellows 66 and 67, the wiper 58 is not affected by changes in atmospheric pressure.

Impedance network 56 also includes a servomotor rebalance potentiometer comprising a resistor 51 whose opposite ends are connected to the corresponding ends of secondary winding 62 and a wiper 52. The wiper 52 is operated by a follow up connection 53 from servomotor 30. A lead 50 extends from one signal input terminal of amplifier 40 to the wiper 52 of network 56.

In the network 56, if at a particular instant the right end of secondary winding 62 be considered positive with respect to its center then the left end of the secondary winding is negative with respect to its center. The right end of resistors 51 and 57 would have the same polarity as the right end of secondary winding 62, also the left end of resistors 51 and 57 would have the same potential as the left end of secondary winding 62. If the wiper 52 be moved from the right end of resistor 51 towards the left end of resistor 51 it may be seen that the potential of wiper 52 with respect to the center of winding 51 varies from a positive value and decreases until the center of the resistor 51 is reached. As the wiper 52 is moved to the left from the center of resistor 51 its potential with respect to the center of resistor 51 increases but is of opposite phase. In other words the wiper now assumes a negative potential with respect to the center of resistor 51. In the position shown the wipers 52 and 58 are at the centers of their respective resistors 51 and 57 and there is no potential difference between them.

Assuming again that the right end of secondary winding 62 is positive with respect to its center and if wiper 58 now be moved to the right of its present position with wiper 52 at center, the wiper 58 will be positive with respect to the wiper 52. On the other hand if wiper 58 be moved to the left from its position shown, its potential with respect to wiper 52 increases but is of opposite phase from the potential developed when wiper 58 was moved to the right. It is therefore seen that the relative position of wiper 58 with respect to wiper 52 determines the phase of the voltage signal developed by network 56.

The turbo boost selector-calibrating impedance network 80 includes a turbo boost selector potentiometer having a resistor 81 whose opposite ends are connected by means of leads 82 and 83 to the corresponding opposite ends of a secondary winding 84 of a transformer having a primary winding 20. A wiper 86 of the potentiometer is driven by an operating connection 87 extending from a turbo boost selector 88. A manually operable knob 89 of the turbo boost selector 88 provides the means for driving connection 87. The knob 89 has a pointer which coacts with indicia for indicating the amount of pressure to be maintained in intake 10. A lead 70 extends from wiper 86 of the turbo boost selector potentiometer to wiper 58 of the intake pressure responsive potentiometer wiper 58.

The impedance network 80 also includes a calibrating or centering potentiometer whose resistor 90 has its ends connected to the corresponding ends of secondary winding 84. A wiper 91 of the centering potentiometer is manually operable by a centering knob 92. The network 80 is similar to the network 56 being in a form of a wheatstone bridge whose output is derived from a voltage difference between wipers 86 and 91. In the positions shown, the wipers 86 and 91 are at the mid-points of their respective resistors 81 and 90. The mid-points of the resistors 81 and 90 like the mid-point of secondary winding 84 is for the purpose under consideration considered the electrical neutral point. With wipers 86 and 91 at their electrical centers of their respective resistors 90 and 81 there is no potential difference across wipers 86 and 91. If one wiper be moved from its electrical center it will have a potential with respect to the other wiper. Similarly if at any time the two wipers have a different displacement from the electrical centers of their resistors, there will be a potential across the wipers 86 and 91.

The altitude-air speed impedance network 110 includes an altitude responsive potentiometer having a resistor 111 whose opposite ends are connected by means of leads 112 and 113 to the corresponding opposite ends of a secondary winding 114 of a transformer having a primary winding 20. A wiper 115 of the altitude responsive potentiometer is electrically connected by means of lead 98 to wiper 91 of the centering potentiometer of network 80. Wiper 115 is operated by a connection 117 extending from a dividing wall 118 of the double bellows altitude sensing arrangement 119.

The altitude sensing device 119 comprises a bellows 120 and a bellows 124 having a dividing wall 118 between them. The bellows 120 and 124 are interposed between fixed frame members. Static pressure or atmospheric pressure is led through an open tube 121 to the interior of bellows 124. A tube 122 communicates with the interior of bellows 120. The tube 122 is connected to a valve 123 whereby the bellows 120 may be selectively placed in communication with the atmosphere. When valve 123 is open the same atmospheric pressure is applied to both bellows 120 and 124 and the dividing wall 118 will have equal pressures applied on its side. In such case no movement will be given to wall 118. If valve 123 be closed and if thereafter the atmospheric pressure should change the pressure within the bellows 120 and 124 would be unequal and the dividing wall 118 having differential pressure applied thereto would move in the direction of the bellows having the smaller pressure.

The impedance network 110 also includes an air speed responsive potentiometer whose resistor 131 is cross-connected by means of leads 133 and 134 to the ends of secondary winding 114. Instead of having the corresponding ends of resistor 131 connected to the ends of secondary winding 114 as has been done with the altitude responsive resistor 111 the leads 133, 134 are crossed as shown to provide the proper phasing of the voltage across the resistor. A wiper 132 of the air speed responsive potentiometer is connected to one end of a resistor of a trimmer potentiometer 135. The opposite end of the resistor is connected to a center tap of resistor 131. A lead 130 connects a wiper of the trimmer potentiometer to ground. The trimmer potentiometer 135 may be adjusted whereby the ratio of the signals from network 110 and network 230, to be described, due to changes in airspeed may be varied. Thus a primary signal on changes in air speed is applied to an elevator motor amplifier input circuit and a secondary signal may be applied to the waste gate motor amplifier input circuit. The wiper 132 is operated by a connection 136 extending from a dividing wall 137 of the air speed response of device 138.

The air speed responsive device 138 comprises a double bellows having sections 141 and 142. The two sections are separated by the dividing wall 137. The sections 141 and 142 are interposed between fixed frame members. A tube 144 connects with the interior of section 142. The tube 144 which communicates with the interior of section 142 has pressure applied thereto proportional to the air speed of the aircraft. A tube 145 communicates with the interior of section 141. The tube 145 also connects with a valve 150. A tube 148 extending from the valve 150 has pressure applied thereto proportional to the airspeed of the craft. The valve 150 may be selectively closed to discontinue the transfer of pressure proportional to air speed from tube 148 to the section 141. The bellows section 141 may therefore be rendered non-responsive to pressures from the air speed device whereas the bellows section 142 is always responsive to the air speed device communicating with tube 144.

The elevator control surface of the aircraft is operated by cables 160 previously mentioned extending from a servomotor cable drum 161. The cable drum is driven by an operating connection 162 extending from a servomotor 164 which may be of the type disclosed in application 447,989 filed June 22, 1942 or in the patent to W. H. Gille et al. 2,425,733 issued August 19, 1947. Such servomotor is powered by a D. C. motor which may be energized by a battery 163.

The servomotor 164 reversibly drives connection 162 as determined by an elevator amplifier 165. The amplifier 165 is connected to a source of alternating current which may be the inverter of the aircraft. The direction of rotation applied to connection 162 by motor 164 depends upon the instantaneous phase relationship between the voltage supplied by the inverter to the amplifier 165 and the voltage across the signal input terminals of the amplifier which are connected to leads 170 and 251.

The amplifier input control elements are connected in a signal circuit which extends from lead 170, a rebalancing-vertical gyro pitch impedance network 180, lead 195, a vertical gyro roll-centering impedance network 210, lead 224, an altitude-airspeed impedance network 230, lead 250, to ground, and to grounded lead 251 of amplifier 165.

The impedance network 180 comprises a servo-balance potentiometer having a resistor 181 whose ends are connected by means of leads 182 and 183 to the corresponding ends of secondary winding 184 of a transformer having a primary winding 20. The primary winding 20 as previously mentioned is connected to the inverter of the aircraft or other source of alternating current, not shown.

The wiper 186 of the servobalance potentiometer is electrically connected by means of lead 170 to one input terminal of amplifier 165. The wiper 186 is operated by the elevator servomotor 164 through the operating connection 162, constituting a follow up arrangement. The impedance network 180 also includes a vertical gyro pitch axis potentiometer whose resistor 190 is connected across the secondary winding 184. A wiper 192 of this potentiometer is operatively connected to a vertical flight gyro 194 by means of an operating connection 193. The vertical flight gyro 194 may be of the type well known in the art having a rotor whose axis of rotation is vertical and in which movement of the plane about the pitch axis causes a proportional relative movement between the operating connection 193 and the aircraft. Since the resistor 190 is carried by the aircraft, a relative movement will therefore result between wiper 192 and resistor 190 when the craft moves about the pitch axis. Wipers 186 and 192 are normally at the electrical centers of their respective resistors 181 and 190. When the wipers are so positioned, there is no potential difference across the wipers 186 and 190. In network 180, as in previous networks, a voltage signal proportional to the potential difference across wipers 186 and 192 is developed whenever the wipers 186 and 192 are differently displaced from the electrical centers of their resistors 181 and 190.

The vertical gyro roll axis-centering impedance network 210 comprises a roll axis responsive potentiometer whose resistor 211 has its ends connected by means of leads 212 and 213 across a secondary winding 214 of a transformer having a primary winding 20. A wiper 215 of the roll axis potentiometer is connected by means of lead 195 to wiper 192 of the pitch axis responsive potentiometer. The wiper 215 is operatively driven by a connection 216 extending from the vertical flight gyro 194. The vertical flight gyro 194 through the operating connection 216 stabilizes the wiper 215 upon movements of the aircraft about the roll axis. The resistor 211 on the other hand is carried by the aircraft consequently upon movement of the plane about the roll axis. The wiper 215 and resistor 211 will have a relative displacement. The impedance network 210 also includes a centering potentiometer whose resistor 218 is connected across the secondary winding 214. The centering potentiometer wiper 219 is manually adjusted by a knob 221. Network 210 may develop a signal voltage when wipers 215, 219 are relatively displaced from the centers of their respective resistors.

The altitude-airspeed impedance network 230 comprises an air speed responsive potentiometer which has a resistor 231 connected by means of leads 232, 233 across a secondary winding 234 of a transformer having a primary winding 20. The air speed responsive potentiometer has a wiper 235 which is operatively driven by means of connection 136 from the dividing wall 137 of the air speed responsive device 138. The lead 224 extends from wiper 235 to wiper 219 of the centering potentiometer. The impedance network 230 includes an altitude responsive potentiometer which has a resistor 237. The opposite ends of resistor 237 are connected to the corresponding ends of secondary winding 234. A wiper 238 of the altitude responsive potentiometer is operatively driven by the dividing wall 118 of the altitude sensing device 119 by an operative connection 117. Wiper 238 is electrically connected to ground by lead 250. Wipers 235 and 238 are normally at the electrical centers of their respective resistors 231, 237. If the wipers 235 and 238 be relatively displaced from the electrical centers of their resistors in the same direction a potential difference will exist across the wipers 235 and 238. The magnitude of the potential difference between wipers 235 and 238 depends upon the differential movement of the two wipers. The phase of the voltage across the wipers in a given half cycle depends upon which wiper has been moved the greatest from the electrical center of its resistor. If in the half cycle considered, the upper end of secondary winding be at a positive potential with respect to the center and the wipers be moved in opposite directions from the centers of their resistor the phase depends upon which wiper is nearer the positive end of secondary 234. A trimmer potentiometer 239 has its resistor connected across wiper 238 and a center tap on resistor 237. Lead 250 connects the trimmer potentiometer wiper to ground. The trimmer potentiometer wiper may be adjusted to vary the ratio of the altitude signal in the network 110 with respect to the altitude signal in network 230. Thus a primary signal on change in altitude may be applied to the waste gate motor amplifier input circuit and a secondary signal may be applied to the elevator motor amplifier input circuit.

*Operation*

While the aircraft is still on the ground and prior to take-off, the aircraft engine is given a ground test. The operation of the engine at this time is designated the engine run-up test. When full throttle is applied to the engine during the run-up test, the manifold pressure of the engine will depend upon the altitude of the place where the engine is being operated. If this manifold pressure does not correspond with that in accordance with the altitude of the place, an increase in the manifold pressure may be due to the fact that the waste gate 19 is partially closed. Initially the turbo selector 89 had been moved to the "0" position. If the pressure of the manifold is above that for the altitude of the place the waste gate may be toward closed position as stated so the centering knob 92 may be adjusted until the proper pressure is obtained.

With the manifold pressure as determined by the carburetor intake pressure at the proper value, the aircraft is ready for the take-off. The selector 89 is now adjusted to provide the proper manifold pressure for take-off.

The valve 123 in the altitude responsive device 119 is open so that tubes 121 and 122 apply the same pressure to the dividing wall 118 so that this wall is not moved. In the air speed device 138, the valve 150 is also open so that the pressures of equal value are conveyed by tubes 144 and 148 to the opposite sides of the dividing wall 137 so that the wall can not move. During the period in which the plane leaves the ground and until it becomes air borne the elevator is operated by a manual controller not shown. At this time the vertical flight gyro with its associated network may be rendered ineffective to control amplifier 165 by opening the control circuit connected to leads 170 and 251 by a switch 171.

After the aircraft has reached the desired altitude and air speed, the turbo boost selector knob 89 is adjusted so that proper or desired manifold pressure is obtained by adjusting the pressure in the carburetor intake line 10. The input circuit to amplifier 165 is now closed at switch 171 thereby placing said circuit under control of the vertical flight gyro 194 and other circuit control elements.

If the plane now inclines upward and thereby tends to change altitude after having been set in straight and level flight by the manual controls it is possible that the amplifier input circuit was unbalanced at level position whereby motor 164 had moved the elevator out of streamlined or normal position. The centering knob 221 of network 210 is therefore adjusted to the right or to the left whereby amplifier 165 causes the motor 164 to again rotate and bring the elevator in streamline position for automatic control at level flight. After the plane has been placed in a level flight position through the control apparatus by the operation of the centering knob 221 of network 210, the knob is left in this position and the aircraft will be maintained in level position by the vertical flight gyro 194.

The manner in which the centering knob 221 is initially operated to return the aircraft to level flight may be apparent by reference to the figure. For example, suppose that after the plane has been manually controlled to the desired altitude that the control of the craft be transferred to the automatic control as stated. If under the automatic control, the airplane should begin to nose upward and to gain altitude the original altitude and level position may be regained by operating center knob 221.

Suppose at this time that the right end of secondary winding 214 is positive with respect to the left end and wiper 192 be to the right of center due to the upward tilt of the aircraft causing the vertical gyro to respond to the tilt. If wiper 219 is moved to the right of wiper 215 it will be positive with respect to wiper 215. Wiper 219 is connected to network 230 to ground and to the terminal of amplifier 165 connected to the ground and lead 251. The wiper 215 is connected to leads 195, 180, lead 170 to the other input of amplifier 165. The amplifier 165 now receives a negative signal. The amplifier 165 thereupon operates and causes the servomotor 164 to move its wiper 186 to the right thereby the potential on wiper 186 becomes greater than potential on wiper 192. In other words wiper 186 is positive with respect to wiper 192. The difference of potential between wipers 186 and wiper 192 is equal and opposite to the difference of potential between wipers 215 and 219. The servomotor 164 continues to move wiper 186 until such equal but opposite voltage is set up. The servomotor also operates the cable drum 161 to move the elevator in a downward position. When the input circuit to amplifier 165 is balanced the servomotor 164 ceases to operate and the elevator remains as positioned.

As the elevator causes the aircraft to depress the nose from its upward inclination, the vertical flight gyro responds to the change in attitude of the aircraft about the pitch axis and moves its wiper 192 to the left thereby causing wiper 192 to become negative with respect to wiper 186. A positive signal will now be applied upon the input circuit to amplifier 165 causing the servomotor to rotate in the opposite direction and move its wiper 186 back toward center. The difference of potential between wiper 186 and wiper 192 is now equal and opposite to the voltage between wipers 215 and 219. The amplifier input circuit is balanced and the elevator is in streamlined position. When the aircraft reaches the desired altitude, the centering knob 221 may be adjusted to hold this altitude with the elevator streamlined. Under normal conditions when the elevator is in its streamlined position, the wipers 186, 192, 215, and 219 are at the electrical centers of their respective resistors.

During the time that the aircraft leaves the ground and until it reaches the desired altitude the pressure of the atmosphere decreases. The decrease in atmospheric pressure causes the carburetor intake pressure in line 10 to decrease. This decrease in the pressure in line 10 is sensed by the intake pressure responsive device 63 since the pressure in section 66 decreases. The spring within the left section 67 of the manifold pressure responsive bellows moves wiper 58 towards the right end of resistor 57. Presuming the right end of the secondary winding to be positive, it may be seen that wiper 58 will be positive with respect to wiper 52. A negative signal will now be applied to amplifier 40 and cause it to effect operation of motor 30 so that the waste gate 19 is moved toward the closed position. As the motor 30 operates valve 19, it also through its follow-up connection 53 positions rebalancing wiper 52 toward the right whereby wipers 52 and 58 are placed at the same potential. The motor 30 therefore stops operating since the input circuit to amplifier 40 is in balanced condition. The closing of the waste gate 19 or its movement toward a closed position causes more exhaust gas to flow through the exhaust turbine 14 thereby increasing its speed. The centrifugal compressor 12 is operated by the turbine 14 from shaft 17 and the rotating speed having been increased the pressure within the line 10 will increase. The pressure responsive bellows 66, 67 thereby maintain the pressure within the line 10 near the desired value.

With the aircraft at the desired altitude and air speeds, the valve 123 of the altitude sensing device 119 is closed and the valve 150 of the air speed responsive device 138 is closed.

It may be seen that if the aircraft rises, should it encounter an upward moving body of air, that the pressure within the bellows 120 exceeds that in bellows 124. The difference in pressure in the two bellows sections 120, 124 exists because the pressure within the chamber or bellows 120 is that at which the valve 123 was closed whereas the pressure within bellows 124 decreases as the altitude increases. The difference in pressure in bellows 120 and 124 causes the dividing plate 118 to be moved upward which through operating connection 117 moves wiper 238 of network 230 and wiper 115 of network 110 in an upward direction in the figure.

In the operation to be described, the action of the two amplifiers 40 and 165 and each of the amplifier input circuit control elements are taken in sequence for purpose of analysis although the actions probably occur simultaneously. It is contemplated however that change in altitude is primarily corrected by change in power and secondarily by change in elevator position to maintain air speed.

Assume at this time that the upper end of secondary windings 234 and 114 are positive with respect to the lower ends shown in the figure. Wiper 238 will now be positive with respect to wiper 235 in network 230. The wiper 238 with the higher potential is connected through lead 250 and ground to the grounded lead 251 of amplifier 165. The wiper 235 which is now negative with respect to wiper 238 is connected through lead 224, network 210, lead 195, network 180, lead 170, to the other terminal of amplifier 165. It is evident that a secondary negative signal as determined also by the adjustment of trimmer potentiometer 239 is applied across the inputs of amplifier 165. A negative signal on amplifier 165 has such phase relationship to the voltage of the inverter which supplies the motor 164 and amplifier 165 as to cause the amplifier 165 to effect rotation of motor 164 in such a direction that the elevator is lowered. The motor 164 in operating the cable drum 161 to lower the elevator also drives the follow-up wiper 186 of the servo balance potentiometer so that wiper 186 is moved towards the right until the input circuit to amplifier 165 is in balanced condition.

The plane has tilted in a downward direction due to the effect of the down elevator. The vertical flight gyro 194 responds to the tilt of the aircraft and moves its wiper 192 towards the left. Wiper 192 is now increasingly negative with respect to wiper 186. So that the input circuit to amplifier 165 is unbalanced in such a direction that the preponderance of the voltage on the amplifier is positive. The positive voltage on amplifier 165 causes the operation thereof which in turn causes the motor 164 to move the elevators back toward center and the wiper 186 is moved until the input circuit to amplifier 165 is again balanced. At this time, therefore, wipers 238, 192, 186 are displaced from normal position and the elevator is in slight down position.

When the altitude responsive device 119 through connection 117 raised the wiper 115 of network 110, wiper 115 was raised or moved toward the positive end of secondary winding 114 and wiper 132 remained in the center position. The wiper 115 became positive with respect to wiper 132. Wiper 115 is connected through lead 98, network 80, lead 70, network 56, lead 50, to one input of amplifier 40. Wiper 132 is connected through lead 130 to ground and from ground through lead 131 to the other input terminal of amplifier 40. The amplifier 40 receives a plus signal across its input terminals which is in phase with the voltage of the inverter or other source of supply of the aircraft. The amplifier 40 now operates and causes the motor 30 to operate under the plus signal in such a direction as to rotate the waste gate 19 toward the open position. The motor 30 through the follow-up connection 53 drives the wiper 52 of the servo balance potentiometer towards the left. It is assumed that the right end of secondary winding 62 is at this time positive with respect to the left end. Therefore, the wiper 52 is negative with respect to wiper 58. The motor 30 drives the wiper 52 until such time as the voltage between wiper 52 and wiper 58 is equal but opposite to the voltage between wipers 115 and 132 of network 110 at which time the input circuit to amplifier 40 is balanced. The motor 30 as previously described stops operating when the input circuit of amplifier 40 is in balanced condition.

With the waste gate 19 moved toward open position, the speed of turbine 14 decreases and the air compressor 12 likewise decreases in speed. The pressure within the carburetor intake line decreases. The pressure responsive element 63 has a decreased pressure imposed on bellows 66. The spring within the bellows 67 therefore moves the dividing plate 65 toward the right. The dividing plate 65 has its movement applied to wiper 58 through connection 64 which is therefore moved to the right. Wiper 58 being moved to the right becomes increasingly positive with respect to wiper 52 which has been moved to the left previously. A negative signal is now applied across the input terminals of amplifier 40 which causes the amplifier 40 to effect rotation of motor 30 in such a direction as to move the gate 19 toward the closed position. Actually the waste gate does not reach its original position. The motor 30 through the follow-up connection 53 also moves the wiper 52 toward the right from its left position until the amplifier input circuit is balanced. Wiper 58 is also to the right of its normal position.

Since the aircraft is in a downwardly inclined attitude due to the slight amount of down elevator, the airspeed does not change because of the decrease in power resulting from slight opening of the waste gate.

Because of the decrease in power and down elevator, the plane moves toward the desired altitude. The pressure responsive device 119 lowers the wiper 115 whereby a negative signal is introduced into the control circuit of amplifier 40 tending to close waste gate 19. As a result, the pressure in line 10 has a tendency to increase due to the fact that the waste gate 19 has been moved back toward its original position. The pressure responsive device 63 associated with intake line 10 therefore has a tendency to move wiper 58 towards the left from its right position whereby a positive signal is impressed on the input circuit of amplifier 40. This positive signal has a tendency to open the waste gate. When the plane regains its original altitude the waste gate is in its original position and wipers 52, 58, 115 are in their original positions.

The altimeter 119, as the original altitude is regained, moves wiper 238 back to its original position whereby the elevator amplifier 165 receives a positive signal causing movement of the elevator to normal position.

The operation of the apparatus when the craft tends to lose altitude instead of gaining is clear from the operation where the plane tends to gain altitude. On decrease in altitude dividing wall 118 moves downwardly calling for closing of the waste gate to provide increased power and applying up elevator to prevent an increase in airspeed because of the increased power. When the altitude is regained the waste gate is moved to normal position and the elevator is streamlined.

The operation of the elevator and the waste gate just described is associated with the response of the apparatus when the altitude of the craft has been increased due to a transient condition such as the upward movement of the body of air in which the aircraft is flying. The aircraft may have a tendency to change its altitude due to a permanent effect on the aircraft as distinguished from a temporary effect which results from an upward movement of the air. Such permanent effect may arise where the aircraft has been in flight for a considerable period of time. The consumption of the gasoline by the motors of the aircraft results in a lessening of the weight in such craft. Since the load of the craft decreases the plane has a tendency to increase its altitude.

Where there is a permanent effect on the aircraft tending to change its altitudes as distinguished from a temporary effect the automatically responsive apparatus will function to return the craft substantially to the desired altitude and air speed. It is evident, however, were the craft brought to the desired altitude and air speed that the permanent effect would manifest itself in a change in altitude of the craft. Actually therefore the aircraft would not regain its desired altitude and air speed because of the permanent effect tending to change the altitude of the craft.

To enable the craft to fly at its desired altitude despite the permanent effect tending to change its altitude the centering knob 221 may be operated whereby a negative signal may be obtained from network 210 if wiper 219 be moved to the right from its position shown. In this situation the centering knob 221 serves as a compensating means to the altitude responsive device 119. The signal derived from network 210 by the displacement of centering knob 221 to the right causes a permanent positive signal to be impressed on the input circuit of amplifier 165. The negative signal derived from network 210 causes the amplifier 165 to effect operation of motor 164 in such a direction as to lower the elevator and to move the wiper 186 to balance the input circuit of amplifier 165. Thus a slight down-elevator may be carried by the aircraft to compensate for the permanent effect or force tending to change the altitude. The knob 92 of bridge 80 may be adjusted to provide the pressure in line 10 at which air speed is maintained.

The operation of the apparatus may be considered when the aircraft tends to increase its speed. It is contemplated that changes in air speed are corrected primarily by operating the elevator from a primary signal from network 230. Network 110 provides a secondary signal in change in air speed which controls the power means to prevent change of altitude.

If the air speed increases over that desired the pressure within bellows 142 exceeds that in bellows 141 consequently the dividing wall 137 is moved in an upward direction in the figure. Dividing wall 137 through its operative connection 136 moves wipers 235 and 132 of networks 230 and 110 respectively in an upward direction. Assuming that the upper ends of secondary windings 114 and 234 are positive with respect to the lower ends it is evident that wiper 235 is positive with respect to wiper 238 and wiper 132 is negative with respect to wiper 115. Network 230 impresses a primary positive voltage signal on the elevator amplifier 165 which positions the elevator in an upward direction. At the same time network 110 impresses a secondary positive voltage signal on the amplifier 40 to open waste gate 19.

Due to the up elevator the aircraft tilts in an upward direction and the vertical gyro 194 responds and sets up a signal whereby the elevator is returned toward streamlined position but attains a slightly up elevator position. The positive signal on the waste gate motor amplifier 40 causes the waste gate motor 30 to open the waste gate 19. The pressure responsive bellows 66, 67 respond to the decrease in pressure within the carburetor intake 10 and cause the repositioning of the valve 19 toward its closed position. The waste gate valve 19 assumes a slightly open position from its normal position.

The purpose of the up elevator which is carried at this time prevents a loss of altitude of the aircraft and the original altitude is maintained. The aircraft flies at the desired altitude but due to the slight opening of the waste gate loses power and therefore the air speed decreases.

As the air speed decreases the dividing wall 137 is moved downwardly toward its normal position. The wipers 235 and 132 are also moved downwardly at this time.

Downward movement of wiper 132 of network 110 results in a negative voltage signal being applied through the waste gate motor amplifier 40 whereby the waste gate motor 30 moves the waste gate 19 toward its original position. Concurrently with this movement of the waste gate 19 the movement of wiper 235 causes the network 230 to apply a negative signal on the elevator amplifier 165. The amplifier 165 causes the elevator servomotor 164 to move the elevator toward streamlined position. When the craft has regained its original air speed the waste gate is in its normal position and the wipers 52, 58 and 132 in the input circuit of amplifier 40 are in their normal positions. Similarly the wipers 186 and 192 and 235 in the input circuit of elevator amplifier 165 are in their normal positions. The plane now has regained straight and level flight with the original altitude maintained and the desired air speed regained.

The operation when the aircraft tends to lose airspeed from a desired value is somewhat the reverse from the operation when it tends to increase air speed. If the air speed decreases from a desired value, the dividing plate 137 is moved downwardly since the pressure within bellows 141 exceeds that in bellows 142. The network 230 impresses a negative primary signal on the elevator amplifier 165 which causes its servomotor 164 to apply down elevator. The down elevator causes the aircraft to increase speed. The network 110 concurrently due to the downward movement of wiper 132 applies a secondary negative signal on the waste gate amplifier 40 whereby the waste gate motor 30 is operated to position the valve 19 toward closing position. The aircraft does not lose altitude from the down elevator due to the compensating effect of increase of power obtained by the closing of the waste gate 19. As the result of the down elevator the speed of the aircraft tends to increase. As the air speed increases and approaches the original desired value the pressure on bellows 142 increases and the dividing wall 137 moves toward its original position. The dividing wall carries with it the wipers 132 and 235 of networks 110 and 230.

The upward movement of wiper 132 causes the network 110 to apply a positive signal to the waste gate amplifier 40 which in turn causes the waste gate motor 30 to move the waste gate 19 toward open position. At the same time movement of wiper 235 upwardly causes the network 230 to apply a positive signal to the elevator amplifier 165. The amplifier 165 causes the elevator servomotor 164 to move the elevator upwardly to normal streamlined position. The aircraft therefore regains its original air speed without losing altitude.

While normally the air speed of the craft does not change when corrections are applied for changes in altitude it is nevertheless evident that if the air speed would change that the air speed meter 138 will so position wipers 132 and 235 as to maintain the desired air speed while altitude corrections are applied. For example, if the aircraft tends to increase in altitude the dividing wall 118 of the altimeter 119 is moved upwardly. This upward movement of the dividing wall causes network 230 to apply a negative signal to the elevator amplifier 165 and causes network 110 to apply a positive signal to waste gate amplifier 40. Down elevator is applied and the waste gate is moved toward open position. The down elevator normally prevents a decrease in air speed when correction is being made for increase in altitude. If the amount of elevator should be such as to cause the air speed to increase, dividing wall 137 of the air speed device 138 is moved upwardly causing the wiper 235 to apply a positive signal on the elevator amplifier 165. This amplifier causes the elevator to be moved toward normal position. Concurrently the wiper 132 is raised sending a positive signal on waste gate amplifier 40 whereby the waste gate 19 is moved toward open position by the waste gate motor 30. In this respect the operation of the air speed meter aids the altimeter 119 in adjusting the waste gate toward open position to reduce the power and consequently the altitude of the aircraft. By the operation of the air speed meter 138 the air speed is maintained constant while the altitude is being corrected.

In a similar manner the altimeter 119 maintains the altitude constant while changes in air speed are being applied.

It is now evident that the apparatus of this invention provides an interrelated altitude and air speed responsive means for the dual control of the engine for propelling the aircraft and an elevator surface for controlling the aircraft. By the apparatus described, a change in altitude occasioned by a temporary condition such as a gust of air is corrected for primarily by the alteration of the power delivered by the engine. In addition the elevator surface is operated to prevent changes in air speed. In other words a change in altitude is primarily corrected by a change in engine power and a secondary operation of the elevator is provided to maintain air speed. A change in air speed, on the other hand, is corrected for primarily by operation of the elevator, and the engine power is altered secondarily to maintain altitude.

The apparatus of this invention also provides means whereby a permanent force tending to change the altitude may be compensated for so that the aircraft will fly at the desired altitude.

I claim as my invention:

1. Flight control apparatus for an aircraft having a control surface and power means for propelling said aircraft comprising: operating means for said control surface; a first balanceable control means for said operating means; a second balanceable control means for said power means; said first control means including a first unbalancing controller responsive to changes in altitude of said aircraft, a second unbalancing controller responsive to the movement of the aircraft about an axis, and a third controller for rebalancing said first control means; and said second control means including a fourth unbalancing controller responsive to changes in altitude of said aircraft, and a fifth controller for rebalancing said second control means.

2. Flight control apparatus for an aircraft having a control surface and power means for propelling said aircraft comprising: operating means for said control surface; a first balanceable control means for said operating means, said first control means including a first unbalancing controller responsive to changes in altitude of said aircraft, a second unbalancing controller responsive to the movement of the aircraft about an axis, and a third controller for rebalancing said first control means; a second balanceable control means for said power means including a fourth unbalancing controller responsive to changes in altitude of said aircraft, a fifth unbalancing controller responsive to changes in said power means, and a sixth controller for rebalancing said second control means.

3. Flight control apparatus for an aircraft having a control surface and means for propelling said aircraft comprising: operating means for said control surface; a first control means for said operating means including a first controller responsive to changes in altitude of said aircraft for initiating operation of said operating means, a second follow-up controller for limiting the operation of said operating means, and a third controller responsive to the movement of the aircraft about an axis as a result of the movement of the control surface by said operating means; a second control means including a fourth controller responsive to the changes in altitude of said aircraft, a second operating means for varying the power of said propelling means, and a fifth controller driven by said second operating means for limiting the movement of said second operating means.

4. Flight control apparatus for an aircraft having a control surface and means for propelling said aircraft comprising: a first operating means for said control surface; a first control means for said operating means including a series of variable impedances said first control means including a first controller responsive to changes in air pressure connected to one variable impedance, a second controller driven by said first operating means and connected to a second variable rebalancing impedance, and a third controller responsive to the movement of the aircraft about an axis and connected to a third variable impedance; a second operating means for altering the power of said propelling means; a second control means for said second operating means comprising a series of connected variable impedances, a fourth controller responsive to changes in air pressure connected to a fourth variable impedance, a fifth controller driven by said second operating means and connected to a fifth rebalancing impedance, and a sixth controller responsive to changes in power of said propelling means and connected to a sixth variable impedance.

5. Flight control apparatus for an aircraft having a control surface and means for propelling said aircraft comprising: a first operating means for said control surface; a first control means for said operating means including a first controller responsive to changes in altitude of said aircraft, a second controller driven by said operating means, and a third controller responsive to the movement of the aircraft about an axis; a second operating means for controlling the air pressure supplied to said propelling means; a second control means for controlling said second operating means including a fourth controller responsive to the altitude of the aircraft, a fifth controller driven by said second operating means, and a sixth controller responsive to the air pressure controlled by said second operating means.

6. Flight control apparatus for an aircraft having a control surface and variable speed means for controlling fuel pressures to power means for propelling said aircraft comprising: a first operating means for said control surface; a first control means for said operating means said first control means including a first controller responsive to departures of air speed from a predetermined amount and a second controller responsive to the first operating means; a second operating means for controlling the variable speed means; a second control means for said second operating means, said second control means including a third controller responsive to the departures of air speeds from the predetermined amount and a controller driven by said second operating means.

7. Flight control apparatus for an aircraft having a control surface and variable speed means for controlling fuel to a power means for propelling said aircraft comprising: a first operating means for said control surface; a first balanceable control means for said operating means, said first unbalancing control means including a first controller responsive to change in air speeds from a preset value, a second unbalancing controller responsive to the movement of the aircraft about an axis, and a third rebalancing controller driven by said operating means; a second operating means for controlling the variable speed means of said propelling means; a second balanceable control means for said second operating means said second control means including a fourth unbalancing controller responsive to changes in air speeds from a preset value and a fifth controller driven by said second operating means.

8. Flight control apparatus for an aircraft having a control surface and power means for propelling said aircraft comprising: a first operating means for said control surface; a first control means for said operating means, said first control means including a first controller responsive to the changes in air speed and a second follow-up controller driven by said first operating means and a third controller responsive to the change in position of said aircraft about an axis; a second operating means for governing the power of said power means; a second control means for said second operating means, said second control means including a fourth controller responsive to the change in altitude of said aircraft and a fifth follow-up controller driven by said second operating means.

9. Flight control apparatus for an aircraft having a control surface and power means for propelling said aircraft comprising: a first operating means for said control surface; a first control means for said operating means, said first control means constituting a rebalanceable network including a plurality of series connected variable impedances; a first controller responsive to changes in air speed connected to one impedance; a second controller driven by said operating means; and a third controller responsive to the movement of the aircraft about an axis; a second operating means for controlling the power of said power means; a second control means for said second operating means, said second control means constituting a rebalanceable network including a plurality of series connected variable impedances; a fourth controller responsive to changes in altitude connected to one impedance in said second control means; and a fifth controller driven by said second operating means connected to another impedance in said second control means.

10. Flight control apparatus for an aircraft having a control surface and power means for propelling said aircraft comprising: a first operating means for said control surface; a first control means for said operating means, said first control means including a first controller responsive to changes in altitude of said aircraft, a second controller responsive to the changes in air speed of said aircraft, and a third or follow-up controller driven by said first operating means, a second operating means for controlling the power of said propelling means; a second control means for said second operating means, said second control means including a fourth controller responsive to changes in the altitude of said aircraft, a fifth controller responsive to changes in air speed of the aircraft, and a sixth controller driven by said second operating means.

11. Flight control apparatus for an aircraft having a control surface and power means for propelling said aircraft comprising: a first operating means for said control surface; a first control means for said operating means said first control means including a first controller responsive to changes in altitude of said aircraft, a second controller responsive to the changes in air speed of said aircraft, and a third or follow-up controller driven by said operating means; a second operating means for controlling the power of said power means; a second control means for said second operating means, said second control means including a fourth controller responsive to changes in air speed of said aircraft and a fifth controller or follow-up controller driven by said second operating means.

12. Flight control apparatus for an aircraft having a power means for propelling said aircraft comprising: a first operating means for controlling the power of said power means; a first control means for said operating means said control means constituting a rebalanceable circuit including a plurality of series connected variable impedances; means responsive to changes in altitude of the aircraft connected to one impedance; means responsive to changes in air speed of said aircraft connected to a second impedance; means for rendering one responsive means effective and the other ineffective; and follow-up means driven by said operating means and connected to a third variable impedance.

13. Flight control apparatus for an aircraft having a control surface for controlling the movements of the aircraft about an axis and power means for propelling said aircraft comprising: a first operating means for said control surface; a first control means for said operating means; a second operating means for controlling the power of said power means; a second control means for said second operating means; each of said control means including a balanceable network comprising a plurality of series connected variable voltage sources; means responsive to changes in altitude of said aircraft to vary a first voltage source in each network; means responsive to changes in air speed of the aircraft to vary a second voltage source in each network; and follow-up means driven by each operating means to vary a third voltage source in each network.

14. In control apparatus for an aircraft having a control surface means for controlling the position of the aircraft about an axis and power means operating on variable fuel air ratios for propelling said aircraft including means for varying said ratio to said power means: a first operating means for said control surface means, a first control means for said operating means; a second control means for said ratio varying means, each said control means including a rebalanceable system; means responsive to changes in altitude and air speed of said aircraft to unbalance each system; means driven by said first operating means for rebalancing one system; and means moved in accordance with changes in fuel ratios for rebalancing said other system.

15. Control apparatus for an aircraft having a control surface means for controlling the movement of the aircraft about an axis and power means for propelling said aircraft comprising: a first operating means for said control surface means; a first control means for said operating means; a second operating means for controlling the power of said power means; a second control means for said second operating means; each of said control means comprising a rebalanceable system and including means responsive to changes in altitude and air speed of said aircraft; one control means also including means responsive to movement of the aircraft about the roll axis and a rebalancing controller driven by said first operating means, the other control means also including a rebalancing controller driven by the second operating means.

16. In combination with an aircraft having an elevator control surface and power means for propelling said aircraft: an altimeter; control surface actuating motor means; means for controlling the power of said propelling means; differential means operated by said altimeter upon decrease in altitude for controlling said motor means to position said surface in a direction tending to increase the elevation of said aircraft; further means concurrently operated by said altimeter and connected to the power control means for increasing the power of said propelling means; air speed responsive means; further means in said differential means operated by said air speed means upon decrease in speed of the craft for controlling said motor means to move the elevator in a direction tending to decrease the altitude of the aircraft; and additional means concurrently operated by said air speed means and connected to said power control means to increase the power of said propelling means.

17. Flight control apparatus for an aircraft having an elevator control surface and a power means for propelling said aircraft, said apparatus comprising: operating means for said control surface; a first balanceable control means for effecting operation of said operating means, said control means including an initiating means responsive in proportion to the altitude changes of said aircraft and unbalancing said control means proportionately to the altitude change and a follow up means driven by said operating means in accordance with the magnitude of unbalance whereby said control means may be rebalanced and said surface positioned; a second balanceable control means for effecting changes in output of said power means in accordance with its unbalance including an initiating means responsive in proportion to the altitude changes of the aircraft and unbalancing said second control means proportionately to the altitude change and a follow-up means responsive to changes applied to said power means whereby said second control means is balanced, whereby said control surface is displaced to compensate for any tendency of the craft to change air speed due to changes in output of said power means to remove the altitude change; and means in said first control means to modify the extent of unbalance thereof caused by said altitude responsive means to accurately provide such control surface compensation.

18. Flight control apparatus for an aircraft having an elevator control surface and power means for propelling said aircraft, said apparatus comprising: operating means for said control surface; a first balanceable control means for said operating means; a second balanceable control means for controlling the power output of said power means, said first and second control means including means proportionately responsive to the magnitude of change in air speed of the aircraft from a predetermined value to effect proportionate unbalance in both said control means; means driven by said operating means to rebalance said first control means and to position said elevator in proportion to change in air speed; means for rebalancing said second control means and adjusting the output of said power means in proportion to the change in air speed, whereby said power means tends to compensate for any tendency to change altitude due to the displacement of said elevator to maintain the predetermined air speed; and manually adjustable means in said second control means to modify the extent of unbalance thereof caused by said speed responsive means to provide such accurate power output compensation.

FRED P. STROTHER.

REFERENCES CITED

The following references are of record in the file of this patent:

UNITED STATES PATENTS

| Number | Name | Date |
|---|---|---|
| 2,160,194 | Bates | May 30, 1939 |
| 2,167,077 | Koster | July 25, 1939 |
| 2,169,982 | Manteuffel | Aug. 15, 1939 |
| 2,191,250 | Fischel | Feb. 20, 1940 |
| 2,311,642 | Crane et al. | Feb. 23, 1943 |
| 2,387,795 | Isserstedt | Oct. 30, 1945 |
| 2,391,896 | Hanson | Jan. 1, 1946 |
| 2,474,618 | Divoll | June 28, 1949 |